United States Patent [19]

Brandener

[11] Patent Number: 4,863,200
[45] Date of Patent: Sep. 5, 1989

[54] FLEXIBLE EXHAUST COUPLING

[75] Inventor: Louis Brandener, Poissy, France

[73] Assignee: Societe Jacques Dubois, Barentin, France

[21] Appl. No.: 212,009

[22] Filed: Jun. 27, 1988

[30] Foreign Application Priority Data

Jul. 2, 1987 [FR] France ................................. 8709388
Jul. 2, 1987 [FR] France ................................. 8709389

[51] Int. Cl.⁴ ............................................. F16L 19/04
[52] U.S. Cl. .................................. 285/234; 285/263; 285/382
[58] Field of Search ............... 285/234, 263, 910, 382, 285/382.2; 411/82, 257, 258, 171

[56] References Cited

U.S. PATENT DOCUMENTS

| | | |
|---|---|---|
| 1,434,631 | 11/1922 | Reynolds . |
| 1,915,100 | 6/1933 | McLaughlin .................... 285/267 X |
| 2,090,266 | 8/1937 | Parker ................................. 285/234 |
| 2,204,316 | 6/1940 | Miller et al. ..................... 285/234 X |
| 3,007,720 | 8/1959 | Breitenstein . |
| 4,097,071 | 6/1978 | Crawford et al. ............... 285/234 X |
| 4,209,177 | 6/1980 | Hall . |
| 4,427,220 | 1/1984 | Decker . |
| 4,462,603 | 7/1984 | Usher et al. ..................... 285/910 X |
| 4,548,415 | 10/1985 | Bendl . |
| 4,659,091 | 4/1987 | Baasner et al. .................. 285/910 X |

FOREIGN PATENT DOCUMENTS

| | | |
|---|---|---|
| 1955305 | 5/1970 | Fed. Rep. of Germany . |
| 2353914 | 5/1975 | Fed. Rep. of Germany . |
| 2822049 | 11/1979 | Fed. Rep. of Germany . |
| 1259811 | 3/1961 | France . |
| 2349761 | 11/1977 | France . |
| 2475685 | 8/1981 | France . |
| 2490778 | 3/1982 | France . |
| 2509005 | 1/1983 | France . |
| 2530288 | 1/1984 | France . |
| 2588916 | 4/1987 | France . |
| 896836 | 5/1962 | United Kingdom . |

Primary Examiner—David A. Scherbel
Assistant Examiner—Anthony W. Williams
Attorney, Agent, or Firm—Gerald J. Ferguson Jr.

[57] ABSTRACT

A flexible exhaust coupling between a first length of exhaust pipe (1) and a second length of exhaust pipe (2), in which the first length of exhaust pipe (1) comprises a pivot portion (3) in the form of a spherical ring projecting outwardly from a portion of the cylindrical outside surface (4) of the first length of exhaust pipe, a first annular exhaust gasket (8) pressing against an inside surface of the pivot portion (3), at least one anti-friction member (9) pressed against an outside surface of the pivot portion (3), and a housing (5) carried by the second length of the exhaust pipe and pressing both the annular gasket and the anti-friction member against the pivot portion (3), and in which the housing comprises a sheet metal collar (6) fixed to the second length of exhaust pipe and extending outwardly therefrom, together with at least one sheet metal bearing sector (7) having an outside edge fixed to the outside edge of the collar (6).

8 Claims, 1 Drawing Sheet

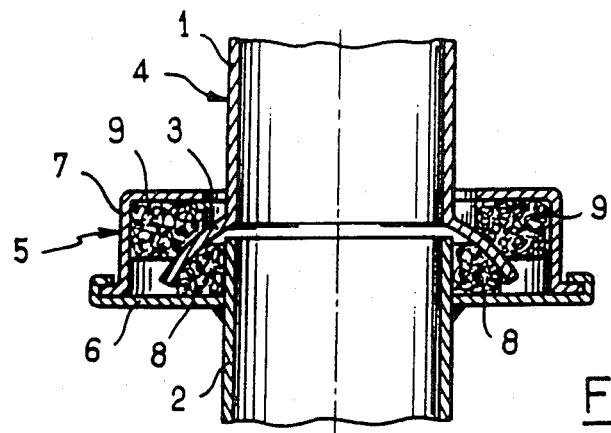
FIG_1
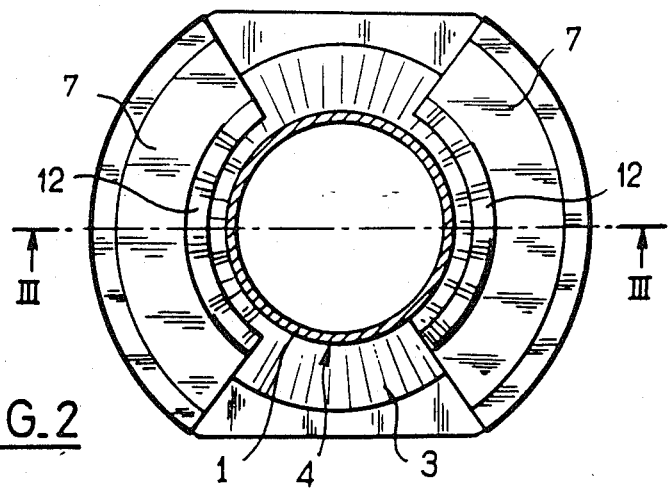
FIG_2
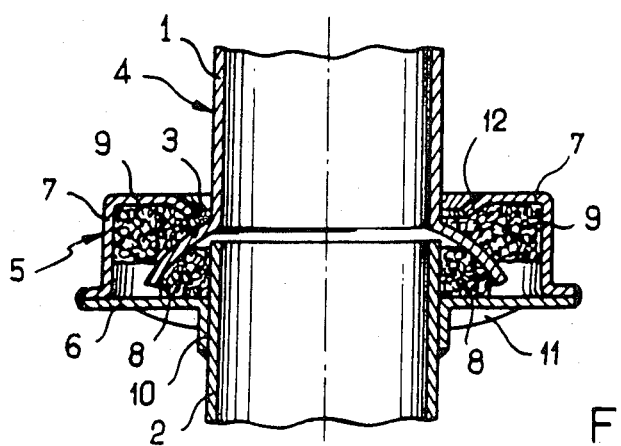
FIG_3

FLEXIBLE EXHAUST COUPLING

The present invention relates to a flexible exhaust coupling between two lengths of exhaust pipe.

When assembling a car, and particularly when assembling a car having a transversely-mounted engine, it is necessary to provide a flexible coupling between the exhaust manifold which is fixed to the engine and the exhaust pipe which is fixed to the bodywork and which supports the silencer.

BACKGROUND OF THE INVENTION

Flexible couplings are already known between two lengths of tube in which a gas flows. In particular, U.S. Pat. No. 4,427,220 describes a flexible coupling comprising a first and a second length of exhaust pipe, in which the first length of exhaust pipe comprises a pivot portion in the form of a spherical ring projecting outwardly from a cylindrical outside surface portion of the first length of exhaust pipe, an annular exhaust gasket pressing against an inside surface of the pivot portion, an anti-friction member pressed against an outside surface of the pivot portion, and a housing carried by the inside of the second length of the exhaust pipe and pressing both the annular gasket and the anti-friction member against the pivot portion.

The structure of the housing in this coupling is extremely complex and completely incompatible with the cost constraints applicable in various fields, and in particular in the field of exhaust pipes for motor cars. Further, because the housing is disposed inside the second length of tube, the housing is directly subjected to the gases flowing along the lengths of tube. This structure is thus incompatible with the coupling being used on lengths of exhaust pipe from car engines having very high exhaust gas temperatures.

An object of the present invention is to provide a flexible exhaust coupling of simple structure, which is easy to make, cheap, and which nevertheless provides good sealing between the lengths of the exhaust pipe.

SUMMARY OF THE INVENTION

In order to achieve this object, the present invention provides a flexible exhaust coupling of the type specified above, in which the housing comprises a sheet metal collar fixed to the second length of exhaust pipe and extending outwardly therefrom, together with at least one sheet metal bearing sector having an outside edge fixed to the outside edge of the collar.

The housing thus forms a compact assembly which is not directly subjected to the exhaust gas and which further provides sufficient stiffness to minimize noise emission when the coupling is subjected to vibration.

In one embodiment of the invention, the anti-friction member is a second annular gasket and the bearing sector is formed by an annular ring having a Z-shaped wall with one of its arms fixed to the collar and with another arm bearing against the anti-friction member.

In another embodiment of the invention, the anti-friction member comprises two anti-friction segments in the form of circular arcs disposed symmetrically about an axis of the second length of exhaust pipe, and the housing comprises two bearing sectors in the forms of circlar arcs each having a Z-shaped wall with one arm fixed to the collar and with another arm bearing against the corresponding anti-friction member.

Advantageously, the bearing sectors include an internal rim folded relative to the corresponding arm of the bearing sector, thereby increasing the stiffness of the housing, and the annular gaskets are made of compressed metal knit, thereby obtaining operating and coupling flexibility while maintaining sealing.

BRIEF DESCRIPTION OF THE DRAWING

Embodiments of the invention are described by way of example with reference to the accompanying drawing, in which:

FIG. 1 is an axial section through a first embodiment of a coupling in accordance with the invention;

FIG. 2 is an end view of a second embodiment of a coupling in accordance with the invention; and FIG. 3 is an axial section on line III—III of the FIG. 2 second embodiment.

MORE DETAILED DESCRIPTION

With reference to FIG. 1, the first embodiment of a flexible exhaust coupling in accordance with the invention comprises a first length of exhaust pipe 1 and a second length of exhaust pipe 2. The end of the first length of exhaust pipe 1 comprises a pivot portion 3 in the form of a spherical ring having a concave inside surface and a convex outside surface. The pivot portion 3 is made, for example, by stamping the end of the first length of exhaust pipe 1 so that the pivot portion 3 extends outwardly relative to a cylindrical outside surface portion 4 of the first length of exhaust pipe.

In addition, a circular annular collar 6 of cut sheet metal is fixed in sealed manner around the inside edge of the second length of exhaust pipe 2, e.g. by welding. The collar 6 extends perpendicularly to the longitudinal axis of the second length of exhaust pipe 2 and is fixed thereon close to one of its ends. The collar 6 projects outwardly from the wall of the second length of exhaust pipe. The end of the second length of exhaust pipe carrying the collar 6 is engaged in the spherical ring 3 formed at the end of the first length of exhaust pipe. A bearing sector in the form of an annular circular ring 7 having a Z-shaped cross-section is associated with the collar 6 by crimping around the outside edge of the collar 6 in order to retain the outside edge of the bottom arm of the annular ring 7 so as to provide a sealed connection between the collar 6 and the annular ring 7, with the annular ring 7 being preferably made of stamped metal sheet. The collar 6 and the annular ring 7 thus form a housing surrounding the pivot portion 3 and given an overall reference 5, the housing is capable of being manufactured very cheaply.

A first annular gasket 8, preferably a compressed metal knit gasket, is disposed around the end of the second length of exhaust pipe 2 and has a convex surface bearing against the concave inside surface of the pivot portion 3. An anti-friction member 9 is constituted by a second annular gasket made of compressed metal knit associated with an anti-friction material and is disposed inside the bearing sector in the form of the annular ring 7. The second annular gasket 9 includes a concave surface bearing against an outer convex surface of the pivot portion 3. Preferably, the first annular gasket 8 and the second annular gasket 9 overlap each other partially in the axial direction of the lengths of exhaust pipe 1 and 2. With respect to the exhaust gases flowing along the inside of the lengths of exhaust pipe, the gaskets 8 and 9 together with the pivot portion 3 and the housing 5 constitute a moving barrier which is substantially gastight while still allowing the first and second lengths of exhaust pipe to move relative to each other.

FIGS. 2 and 3 show a second embodiment which, like the first embodiment, comprises a first length of exhaust pipe terminated by a pivot portion 3 in the form of a spherical ring and associated with a second length of the exhaust pipe 2. As before the annular collar 6 is fixed perpendicularly to the second length of exhaust pipe 2. This time, the collar 6 includes a cylindrical skirt 10 which may be obtained by stamping metal sheet, and which surrounds the second length of exhaust pipe 2 onto which it is fixed. In this embodiment, the housing 5 comprises two bearing sectors 7 in the form of arcs of circles disposed symmetrically about the axis of the second length of exhaust pipe and each having a Z-shaped wall whose bottom arm is welded along its outside edge to the outside edge of the collar 6, and whose top arm bears against two anti-friction segments 9 in the form of circular arcs. These anti-friction segments are preferably lengths of annular gasket made by compressing a metal knit with an anti-friction material such as mica or graphite. In order to prevent the anti-friction members 9 from escaping via a lateral end of either bearing sector 7, abutments (not shown) are advantageously provided by radially folding the lateral edges of the bearing sectors 7. The anti-friction segments 9 and the bearing sectors 7 preferably extend over a portion only of the periphery of the pivot portion 3 in order to avoid extending significantly beyond the outside diameter of the pivot portion 3. Preferably, the collar 6 also includes folded back edges 11 between the bearing sectors 7, thereby not only providing greater stiffness for the collar 6, but also reducing the volume occupied by the coupling along a direction about which the bearing sectors are symmetrically disposed.

In the embodiment shown, each of the bearing sectors 7 extends over about one fourth of the periphery of the pivot portion 3.

In the preferred embodiment shown, each bearing sector 7 comprises an inside rim 12 folded towards the anti-friction segment 9 relative to the corresponding arm of the bearing sector. The folded rim 12 provides the advantages not only of increasing the stiffness of the bearing sector 7, but also of holding the corresponding anti-friction segment 9 more firmly in place.

It may be observed that the pivot portion 3 is held pressed against the annular gasket 8 but is free to slide relative thereto such that the force on the bearing sector 7 is mainly directed along the axis of the second length of exhaust pipe and corresponds to the axial component only of the relative movements between the two lengths of pipe, thereby considerably reducing fatigue in the bearing sectors 7.

Naturally the invention is not limited to the embodiments described and variant embodiments may be designed without going beyond the scope of the invention. In particular, the axial resilience of the coupling may be increased by providing a non-woven fibrous substance inside the bulk of the compressed metal knit of the annular gasket 8 or of the anti-friction member 9. The first annular gasket 8 may also be made of ceramic material. It is preferable for the first annular gasket also to have anti-friction properties, by example by associating an anti-friction material such as a sheet of mica or a sheet of graphite with a sheet of metal prior to compressing the knit. In addition, the means for fixing the collar 6 and the thrust sectors 7 are not limiting. In particular, in the FIG. 1 embodiment, the annular ring 7 may be welded to the collar 6. It is also possible, in this first embodiment, to provide a folded-down rim 12 along the inside edge of the annular ring 7.

I claim:

1. A flexible exhaust coupling between a first length of exhaust pipe and a second length of exhaust pipe, in which the first length of exhaust pipe comprises a pivot portion in the form of a spherical ring projecting outwardly from a cylindrical outside surface portion of the first length of exhaust pipe, a first annular exhaust gasket made of compressed metal knit outwardly engaged on an end of the second length of exhaust pipe and pressing against an inside surface of the pivot portion to normally space the first and second lengths of exhaust pipe from each other, at least one anti-friction member pressed against an outside surface of the pivot portion, and a housing carried by the second length of the exhaust pipe and pressing both the annular gasket and the anti-friction member against the pivot portion, the housing comprising a sheet metal collar fixed to the second length of exhaust pipe and extending outwardly therefrom, and at least one sheet metal bearing sector having an outside edge fixed to an outside edge of the collar by soldering or crimping.

2. A flexible exhaust coupling according to claim 1, wherein the anti-friction member is a second annular gasket and wherein the bearing sector is formed by an annular ring having a Z-shaped wall with one of its arms fixed to the collar and with another arm bearing against the anti-friction member.

3. A flexible exhaust coupling between a first length of exhaust pipe and a second length of exhaust pipe, in which the first length of exhaust pipe comprises a pivot portion in the form of a spherical ring projecting outwardly from a cylindrical outside surface portion of the first length of exhaust pipe, a first annular exhaust gasket pressing against an inside surface of the pivot portion, at least one anti-friction member pressed against an outside surface of the pivot portion, the anti-friction member being a second annular gasket, and a housing carried by the second length of the exhaust pipe and pressing both the annular gasket and the anti-friction member against the pivot portion, the housing comprising a sheet metal collar fixed to the second length of exhaust pipe and extending outwardly therefrom, and at least one sheet metal bearing sector having an outside edge fixed to an outside edge of the collar, wherein the bearing sector is formed by an annular ring having a Z-shaped wall with one of its arms fixed to the collar and with another arm bearing against the anti-friction member, and the bearing sector includes an internal rim folded down relative to the corresponding arm of the bearing sector.

4. An exhaust coupling according to claim 2, wherein the second annular gasket is made of compressed metal associated with an anti-friction material.

5. A flexible exhaust coupling between a first length of exhaust pipe and a second length of exhaust pipe, in which the first length of exhaust pipe comprises a pivot portion in the form of a spherical ring projecting outwardly from a cylindrical outside surface portion of the first length of exhaust pipe, a first annular exhaust gasket pressing against an inside surface of the pivot portion, and at least one anti-friction member pressed against an outside surface of the pivot portion, wherein the anti-friction member comprises two anti-friction segments in the form of circular arcs disposed symmetrically about an axis of the second length of exhaust pipe, and a housing carried by the second length of the exhaust pipe and pressing both the annular gasket and the anti-friction member against the pivot portion, and wherein the housing comprises a sheet metal collar fixed to the second length of exhaust pipe and extending outwardly therefrom, and two sheet metal bearing sectors each having an outside edge fixed to the outside edge of the collar, and each being in the form of circular arcs each having a Z-shaped wall with one arm fixed to the collar and with another arm bearing against the corresponding anti-friction member.

6. An exhaust coupling according to claim 5, wherein the bearing sectors include an internal rim folded relative to the corresponding arm of the bearing sector.

7. An exhaust coupling according to claim 5, wherein the first annular gasket is a compressed metal knit gasket.

8. An exhaust coupling according to claim 5, wherein the anti-friction segments are made of compressed metal knit associated with an anti-friction material.

* * * * *